United States Patent [19]

Kops et al.

[11] 4,101,620

[45] Jul. 18, 1978

[54] PROCESS FOR PRODUCING A PLASTIC SHEET HAVING PARALLEL RIBS EXTRUDING FROM BOTH SURFACES

[75] Inventors: Friedrich Kops, Cologne; Helmut Kaufmann, Troisdorf; Karl-Heinz Schymetzko, Lulsdorf, all of Fed. Rep. of Germany

[73] Assignee: Dynamit Nobel Aktiengesellschaft, Fed. Rep. of Germany

[21] Appl. No.: 495,432

[22] Filed: Aug. 7, 1974

Related U.S. Application Data

[63] Continuation-in-part of Ser. No. 193,487, Oct. 28, 1971, abandoned.

[30] Foreign Application Priority Data

Nov. 3, 1970 [DE] Fed. Rep. of Germany ....... 2054029

[51] Int. Cl.² ................................................ B29F 3/08
[52] U.S. Cl. ................................ 264/177 R; 264/237; 264/348
[58] Field of Search ........... 264/177, 210 R, DIG. 47, 264/237, 348; 425/461, 378, 380

[56] References Cited

U.S. PATENT DOCUMENTS

| 3,164,948 | 1/1965  | Stratford ........................... 264/177 R |
| 3,324,217 | 6/1967  | Armstrong et al. ............. 264/210 R |
| 3,478,138 | 11/1969 | Friesner ................................. 264/175 |
| 3,547,891 | 12/1970 | Snead et al. ..................... 264/210 R |
| 3,574,809 | 4/1971  | Fairbanks et al. ............... 264/177 R |
| 3,594,870 | 7/1971  | Schippert .................... 264/DIG. 47 |

*Primary Examiner*—James B. Lowe
*Attorney, Agent, or Firm*—Craig & Antonelli

[57] ABSTRACT

A process for the production of bilaterally corrugated plastic sheets by extruding a plastic synthetic resin composition, preferably soft PVC, from a slotted nozzle fashioned in a double comb-like shape, stretching the sheet in the longitudinal direction of the ribs during the drawing-off process and passing the sheet through a cooled glazing or smoothing calender. Also disclosed are various sheets produced by the above-process as well as methods for joining the same together.

45 Claims, 4 Drawing Figures

PROCESS FOR PRODUCING A PLASTIC SHEET HAVING PARALLEL RIBS EXTRUDING FROM BOTH SURFACES

CROSS-REFERENCE TO RELATED APPLICATION

The present application is a continuation-in-part of application Ser. No. 193,487, filed Oct. 28, 1971, and now abandoned.

BACKGROUND OF THE INVENTION

This invention relates to a process for the production of a bilaterally corrugated or ribbed plastic sheet, preferably of soft PVC, which is produced in one operating step.

Such plastic sheets are utilized as seals against pressure water, seepage water, and surface water, in particular, to cover and seal inclined surfaces, for example, canal banks, dikes, or embankments (earth dams). Furthermore, it is possible to line a river bed with these plastic sheets, in order to prevent the water from seeping into the ground and, thus, the drying out of the river bed.

It is conventional to produce seals against pressure water, seepage water, and surface water by the use of bitumen or with plastic sheets which are loosely laid. However, a bituminous sheet exhibits the disadvantage that it has a permeability to water and water vapor, even though minimal, and swells under the effect of water. Furthermore, since bitumen is subject to aging, it cannot be used for durable sealing systems, as are required, for example, for ship channels.

In case of smooth plastic sheets, difficulties are often encountered when they are welded together in the field since, due to voltage fluctuations in the current supply mains and due to other disturbances, holes can be melted in the sheet, or the thus-produced welding seams are not sufficiently tight. For the purpose of sealing off inclined surfaces, such as canal banks, dikes, or embankments, plastic sheets can either not be used at all or used only with very great difficulty since, in case of rain, water collects on the sheet surface and forms a water-saturated zone, whereby the earth cover, under its own weight, slides off the sheet. When using, in place of earth, covering material such as crushed rock, larger stones, or the like, the sealing skin of the plastic sheet is endangered. Covering with prefabricated concrete slabs is expensive and requires an abutment at the foot of the bank.

Corrugated sheets are conventional which are ribbed on one side, as well as plastic sheets which are roughened by flakes made of the same material. Although this prevents the sliding off of earth masses from the corrugated or flake-covered side, the shear stresses caused by the covers on the topside of the sheet are transferred to the smooth underside of the plastic sheets. Therefore, a sliding off of the film sheets in this plane cannot be avoided if the banks are steep and the load resting on the sheet is large. The tear (or tensile) strength of the material can then be readily exceeded.

Bilaterally ribbed plastic sheets can be produced by placing unilaterally ribbed sheets with their smooth sides on top of each other and joining same. However, this procedure is very expensive, due to the plurality of working steps required. The sheets heretofore employed for this purpose exhibit rather high ribs which are arranged at large mutual spacings, so that furthermore a uniform windup of the film sheets is thereby prevented.

Also, the joining of the sheets causes difficulties, because of the high ribs at right angles to the sheet. Such places cannot be welded together with the required safe seal, since even the smallest openings must be avoided due to their capillary action.

SUMMARY OF THE INVENTION

Accordingly, this invention is based on the problem of developing a process wherein a bilaterally corrugated film sheet can be produced in a single operating step. During the shaping of the corrugations, the aforementioned disadvantages are avoided.

This invention relates to a process for the production of bilaterally corrugated or ribbed plastic sheets wherein a plastic synthetic resin composition, preferably soft PVC, is extruded from a slotted nozzle (or die) which is fashioned to be comb-like on both sides; the film is stretched in the longitudinal extension of the ribs by pulling the film away from the nozzle; and then conducted through a cooled glazing calender.

The corrugated sheet produced in accordance with this process exhibits a completely uniform rib arrangement equal on both sides, wherein the height and width of the ribs are approximately from about 1/15 to about equal to the thickness of the basic, unribbed center portion of the sheet. While the ribs possess a minimum height of 0.2 mm., the width of the sheet is determined by the width of the tool. Such a corrugated sheet leaves the internal frictional resistance of fill materials, such as, for example, sand, clay, earth, etc. practically unchanged. Also, in the water-saturated condition of the fill materials, the internal frictional resistance is retained. Furthermore, the corrugated sheets can be joined together rapidly and without any difficulties with the required degree of safety. Due to the relatively low ribs, as they are preferably produced according to the process of this invention, the sheet can furthermore be uniformly wound up into a relatively tight coil.

BRIEF DESCRIPTION OF THE DRAWINGS

Various other features and advantages will become apparent from the following detailed description of the invention when taken in conjunction with the accompanying drawings, in which.

DETAILED DESCRIPTION OF THE INVENTION

In order to conduct the process of this invention, an extruder, having a wideband nozzle, is utilized. This wideband nozzle is provided at the upper and lower sides in the flow direction with milled-in grooves. The plastic composition of the synthetic resin is extruded and drawn off from the nozzle at a fixed rate. The rate is preferably adjusted to be the same as the extrusion rate. At this rate the ribs are inherently deformed to a minor degree by the normal cooling-off process so that they assume a final shape deviating from the cross-section of the nozzle or die. Thus, the ribs are fashioned to be narrower and more precise by the draw-off step at a fixed rate. It is to be noted that under some circumstances, depending upon the nature of the extruded material, the rate of draw-off may slightly lead the rate of extrusion. For the most part, however, a lead in draw-off is undesirable since the resultantly stretched material is susceptable to subsequent shrinkage at elevated temperatures.

The thus drawn-off sheet is conducted through a cooled glazing or smoothing calender, whereby the ribs are smoothed and the sheet solidifies, so that a corrugated sheet is obtained wherein the ribs are of equal height on both sides, are additionally disposed at identical points, and are of a completely uniform configuration.

Figure 1:
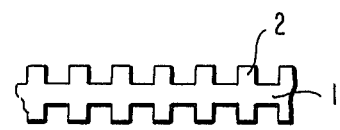
FIG. 1 is a cross-section of corrugated sheet according to an embodiment of the invention.

In FIG. 1, a section through a thus-prepared sheet is illustrated. The basic sheet 1 is provided on both sides with ribs 2 which are preferably in exact opposition, since in this case an extraordinarily uniform rib configuration is obtained by the calendering step. The heights of the ribs on the topside and bottom side of the sheet are identical. This enables the subsequent joining of two corrugated sheets in a simple and practical manner. In such case, it makes no difference during the later processing of the film sheets, which side is taken as the topside.

The relatively low ribs do not exhibit any disadvantages as compared to high and widely spaced-apart ribs. The internal frictional resistance of fill materials, such as sand, is substantially unchanged by the low, closely spaced ribs. On the other hand, the advantage is achieved that film sheets with low ribs can be wound up very well and in a space-saving manner, and therefore result in a considerable reduction of transportation costs.

The spacing between the ribs is most favorably selected so that it is only little larger than the width of the ribs, so that the capillaries between the ribs of two superimposed sheets, which are to be joined in this manner, are as small as possible.

The thickness of the basic film 1 is determined by the tool and the draw-off speed of the plastic synthetic resin composition. Preferably, the film has a thickness of 0.5 – 3 mm.

Figure 2:
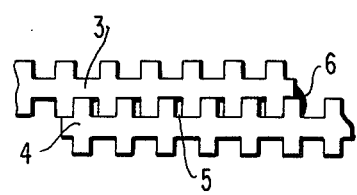
FIG. 2 illustrates the joining of two sheets of the type shown in FIG. 1.

The thus-produced ribbed sheets can be placed one on top of the other with their edges, as shown in FIG. 2, and can be joined by liquid film or a filled adhesive. When the sheet is of soft PVC, the best method resides in utilizing a liquid film which is soft PVC dissolved in tetrahydrofuran. For this purpose, the sheet 3 is placed over the sheet 4, so that the ribs interlock and leave only the empty spaces 5. At the overlapping points, the liquid film is then applied, so that the hollow spaces 5 are sealed and the sheets 3 and 4 are joined together. In the direction of the ribs, the two film sheet are then likewise joined by means of liquid film 6, so that an entirely waterproof cover is obtained. Suitably, a liquid film is used which has a different color than the sheets, so that it is readily apparent at which places the sheets have not yet been joined together.

Due to the fact that the ribs are very low, it is likewise possible to join a sheet, wherein the direction of the ribs extends in one direction to another sheet wherein the rib direction is at right-angles to said one direction.

Figure 3:
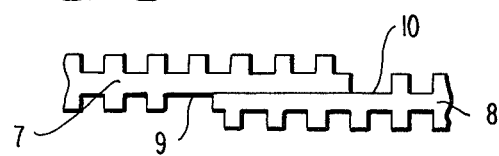
FIG. 3 portrays a further joining of two corrugated sheets according to another embodiment of the invention.

Furthermore, it can be advantageous, as shown in FIG. 3, to provide on the topside and on the underside of the corrugated sheet in each case a narrow strip without ribs, these strips being provided on the opposite edges. This approach makes it possible to establish a bond between sheets 7 and 8 via strip portions 9 and 10, which are placed one on top of the other, and joined by means of the aforementioned liquid film or a filled adhesive.

Figure 4:
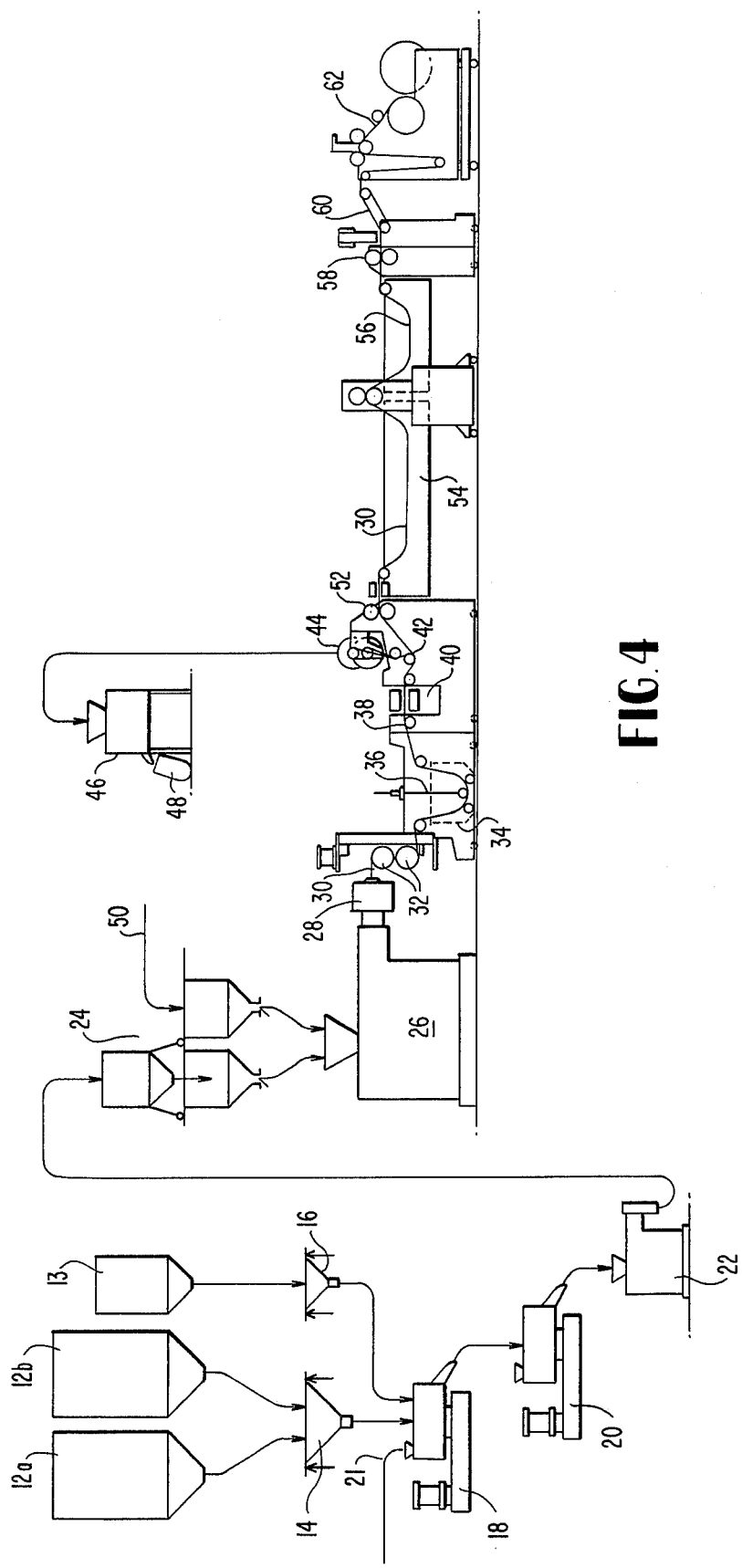
FIG. 4 is a flow diagram illustrating an extrusion plant for producing corrugated sheets according to the present invention.

In order to produce corrugated sheets according to the present invention, the flow scheme illustrated in FIG. 4 can be utilized. As shown in this figure, the individual materials for producing a polymer mixture, such as a mixture of soft PVC, for forming the corrugated sheet are fed from supply bins 12a, 12b and 13 via weighing units 14 and 16 to mixers 18 and 20. In the embodiment shown, supply bins 12a and 12b contain pulverulent soft PVC while supply bin 13 contains a plasticizer for the soft PVC, the amount of plasticizer utilized usually being about 30 to 40% of the quantity of PVC. If desired, suitable additives and the like can be added to the polymeric material through inlet 21 in mixer 18. From mixer 20, the polymer mixture enters granulator 22 where it is granulated to a suitable particle size. From granulator 22, the granulated polymeric mixture is fed to loading platform 24 in preparation for feeding to the extruder.

From loading platform 24 the granulated polymer mixture is fed to extruder 26. In the extruder, the polymer material is heated in the first plasticizing zone to a temperature of about 155° C., thereafter in the second plasticizing zone to about 140° C., and in the ejection zone to a temperature of about 165° C. to 175° C., the temperatures varying within the range of about 10° C. 165° C. can be considered to be the approximate minimal extrusion temperature for the specific material described herein, namely soft PVC. Higher extrusion temperatures such as up to 180° C., for example, can generally be employed for this material. As appreciated by those skilled in the art, the extrusion temperature will also be dependent on the specific composition of the thermoplastic material employed, the quantity of plasticizer being an important factor.

From the extrusion zone, the polymer material at about 165° C. is extruded (as heretofore described) through a wide band nozzle 28 provided at its upper and lower sides in the flow direction with milled in grooves, nozzle 28 further having a fishtail configuration. The polymer material can be extruded at any convenient extrusion velocity, such as, for example 1 to 2 cm/sec and preferably 1.2 to 1.5 cm/sec.

As shown in FIG. 4, the extruded ribbed sheet 30 is horizontally extruded from the nozzle or die 28 and is guided after passing out of the extruder by means of cooled smoothing calender including rolls 32. Rolls 32 are chrome-plated or streaked-matte-finished cylindricl rolls and are driven at a speed corresponding to the extrusion speed of the ribbed sheet. Preferably, rolls 32 are adapted to be independently controlled.

As further shown in FIG. 4, ribbed sheet 30 tangentially engages the periphery of the upper of rolls 32 and remains in contact with this roll as it rotates through a suitable arc, shown in this figure as about 180°. Ribbed sheet 30 then passes between the nip defined by the rolls 32 and then remains in contact with the periphery of the lower roll 32 as it rotates through a suitable arc, also shown in FIG. 4 to be about 180°.

Rolls 32 around and through which ribbed sheet 30 passes are also temperature-controlled, in the embodiment shown by means of a warm oil at about 50° C. In normal operation, upper roll 32 is usually at a temperature of about 45° to 55° C., preferbly 50° C., while lower roll 32 is usually at a temperature of also about 45° to 55° C., preferably 50° C. These temperatures are substantially lower than the temperature of the extruded ribbed sheet, so that the ribbed sheet 30 is gradually cooled as it passes around and through rolls 32 from a temperature of about 165° to 175° C. to a temperature of about 135° to 150° C. Normally, the temperature of ribbed sheet 30 after passing through calendar rolls 32 is about 25° to 30° C. lower than the extrusion temperature. The degree of cooling effected by calender rolls 32 depends both on the extrusion rate and the thickness of ribbed sheet 30 as can be readily appreciated by those skilled in the art.

As can further be seen from FIG. 4, it will be noted that rolls 32 are positioned closely adjacent to nozzle or fishtail die 28. Specifically, rolls 32 are spaced from fishtail die 28 as closely as possible, in the embodiment shown about 10 cm at maximum, this distance depending solely on the dimensions and configurations of the extruder, nozzle 28, calender rolls 32, and so forth. Normally, rolls 32 are positioned so that the distance traveled by ribbed sheet 30 as it passes from nozzle or die 28 to the point where it tangentially engages upper roll 32 is about 2 to 10 cm.

As can be seen, extruded ribbed sheet 30 is supplied to calender rolls 32 directly after extrusion, that is, after leaving nozzle or die 28. The ribbed sheet leaves fishtail nozzle 28 approximately at the extrusion temperature, in the embodiment described approximately 165° C., and is only slightly cooled as it travels from the nozzle to the first calender roll 32. In the course thereof, it should be appreciated that the ribs projecting on either side of the extruded sheet can inherently undergo more heat exchange with the surrounding air and/or with calender roll 32 so that when considering the total maximum thickness of the ribbed sheet, the ribs cool more rapidly than does the center portion, that is, than the actual sheet. The individual temperatures of the various portions of the ribbed sheet as it is being cooled are determined by the operating conditions of the system. In any event, the important feature is that the speeds of the succeeding calender rolls and removal devices are adapted to the extrusion rate of the rib sheet, which is preferably relatively slow. In other words, it is important that the ribbed sheet is moved through the system as a whole at a rate which ensures that no local acceleration, and hence no elongation, of the sheet occurs.

After sheet 30 has been smoothed, cooled and solidified by cooled smoothing calender rolls 32, it passes into cold water tank 34 which is equipped with a dancer roll system 36 for controlling slack so that extruded sheet 30 is not longitudinally stretched by an excessively fast takeoff. Thereafter, ribbed sheet 30 passes over a hole-detecting means 38 where previous places in the sheet are marked. Then, the ribbed sheet 30 passes through a thickness-gauging means 40.

After passing through thickness-gauging means 40, ribbed sheet 30 is guided past bench cutter 42 where the longitudinal edges of the ribbed sheet are cut off. These cut off longitudinal edges are wound up by means of a reeling machine 44 and fed to a comminuting device 46. There, the polymeric material forming the cut off edges of the ribbed sheet is comminuted and discharged into containers 48 and then fed back to feeding platform 24 by means of inlet line 50.

After passing out of edge cutter 42, ribbed sheet 30 is fed via takeoff rolls 52 to a tempering bath 54 containing hot water at a temperature of about 100° C. Thereafter, ribbed sheet 30 is passed into precooling tank 56 filled with flowing water at room temperature and is then conducted via takeoff rolls 58 to a finishing zone utilizing hammer shears 60 or to windup machine 62 to complete the manufacturing process.

In order to more fully illustrate the principles of the present invention, the following example is presented:

EXAMPLE 26.8 kg/hr. of shoft PVC in the form of a powder is fed from bins 12a and 12b of the apparatus of FIG. 4, while 8.2 kg/hr. of a plasticizer for the soft PVC is fed from bin 13 to mixer 18. The mixture so formed is passed from mixer 18 to mixer 20 where it is further mixed. From mixer 20, the mixture is passed to granulator 22 where it is granulated into a conventional extruder feed in the form of a coarse granulate. The granulated polymeric mixture is then fed to loading platform 24 at an initial flow rate of about 35 kg/hr. Once operation has begun, comminuted polymeric mixture obtained from comminuting device 46 is fed to loading platform 24, and accordingly the flow rate of polymeric material from mixer 22 is reduced so that the feeding rate of the combined extruder feed from mixer 22 and comminuting device 46 is a constant 35 kg/hr.

From loading platform 24, the comminuted and granulated polymeric mixture is fed to extruder 26. In extruder 26, the polymeric material is initially heated to a temperature of about 150° C., then to a temperature of about 170° C., and finally to a temperature of about 175° C. at which temperature it is extruded through fishtail die 28. Fishtail die 28 is formed with an orifice having a configuration essentially as shown in FIG. 1, with the die orifice having an overall length of 50 cm and a maximum height (that is the distance between the opposing lateral faces of the orifice in those portions corresponding to the ribs of the ribbed sheet) of 0.06 cm. In addition, the height of the orifice in the die corresponding to the unribbed center portion of the ribbed sheet is about 0.02 cm.

Ribbed sheet 30 is extruded from fishtail die 28 at an extrusion speed of 1.25 cm/second. The extruded rib then contacts upper roll 32 which is so spaced from the orifice in fishtail die 28 that extruded ribbed sheet 30 travels 5 cm before tangentially contacting upper roll 32.

Upper roll 32 and lower roll 32 are maintained at temperatures of about 50° C. by means of oil. Ribbed sheet 30 accordingly is smoothed, cooled and solidified as it passes around rolls 32 and leaves roll 32 at a temperature of about 150° C.

The smoothed, cooled and solidified ribbed sheet 30 then enters cooling bath 34 containing water maintained at a temperature of about 14° C. The cooled ribbed sheet 30 at a temperature of about 45° C. then passes over a hole-detecting means 38, thickness-gauging means 40 and bench cutter 42 where the longitudinal edges of the ribbed sheet are cut off and fed to comminuter 46.

Ribbed sheet 30 is then fed to a tempering bath 54 containing water maintained at a temperature of about 100° C. and thereafter to precooling tank 56 containing water maintained at a temperature of 14° C., the respective residence times in tempering bath 54 and precooling tank 56 being about 4 min. and 2 min. The tempered and precooled ribbed sheet 30 is then conducted via take-off rolls 58 to either hammer shears 60 or wind-up machine 62 to complete the manufacturing operation.

The ribbed sheet made in accordance with this example was found to have an overall width of 50 cm and an overall thickness of 0.21 cm, with the center unribbed portion of the sheet having a thickness of 0.07 cm. In addition, the ribbed sheet contained ribs exhibiting an extremely uniform size and configuration, each rib being 0.07 cm high, 0.07 cm thick and each rib being spaced from adjacent ribs by 0.08 cm.

Although only a few embodiments of the present invention have been specifically described above, it should be appreciated that many modifications can be made without departing from the principles of the present invention. For example, although PVC has been described as the synthetic resin material useful in the inventive process, it should be appreciated that any extrudable material such as thermoplastic resins and the like can be utilized. For example, polyethylene can be used. In this connection, it should also be appreciated that the specific process parameters described in the present example such as, for example, the extrusion temperatures, the temperature of the cooling and smoothing calenders, the spacing of the extrusion die and the calenders, the cooling bath temperatures and so forth can be varied from the specific values set forth in the present specification in order that the teachings of the present invention can be applied to materials other than PVC. Similarly, the various parameters of the inventive process such as, for example, the extrusion speed and the spacing of the extrusion die and the calender rolls can be varied so long as the extruded ribbed sheet is cooled and smoothed in accordance with the teachings of the present invention. Also, it should be appreciated that the present invention can be employed to make ribbed sheets of any convenient size, such as for example 120 cm in width.

The foregoing specification and drawings have been presented for illustrative purposes only and are not intended to limit the invention in any way. All reasonable modifications are intended to be included within the scope of the present invention, which is to be limited only by the following claims.

What is claimed is:

1. A process for producing an unstretched bilaterally corrugated plastic sheet having a plurality of longitudinally extending parallel ribs on both sides thereof comprising extruding in a horizontal plane a plastic synthetic resin composition from a slotted nozzle which is fashioned to be comb-like on both sides thereof to form an extruded sheet having longitudinally extending parallel ribs on both sides thereof heated to an extrusion temperature, drawing off the extruded heated sheet in the longitudinal direction of the ribs from said slotted nozzle by conducting the sheet through a cooled smoothing calender, and cooling the extruded sheet within said calender to a temperature below the extrusion temperature to thereby form said unstretched bilaterally corrugated plastic sheet, said extruded sheet being drawn off from said nozzle at a fixed rate which is the same as or slightly more than the extrusion rate from said nozzle so that the ribs on said unstretched bilaterally corrugated plastic sheet exiting from said smoothing calender are uniform in size and shape, the height and width of the ribs being from about 1/15 to about equal to the thickness of a basic, non-ribbed, portion of the sheet and the basic, non-ribbed, portion of the sheet having a thickness of about 0.5 to 3 mm.

2. The process according to claim 1, wherein the arrangement of said cooled smoothing calender with respect to said slotted nozzle and the extent of cooling provided by said cooled smoothing calender are so selected that said extruded sheet solidifies as it passes through said calender.

3. The process according to claim 2, wherein the shape of said nozzle and the extent of the smoothing provided by said cooled smoothing calender are so selected that the ribs on the bilaterally corrugated plastic sheets are rectangular in cross-section.

4. The process according to claim 3, wherein said slotted nozzle exhibits a uniform mirror-symmetrical rib design so that the rib configuration on one side of the sheet is a substantially uniform, mirror-symmetrical image of the rib configuration on the other side of the sheet.

5. The process according to claim 1, wherein said plastic synthetic resin is soft PVC.

6. The process according to claim 1, wherein the plastic synthetic resin composition is extruded and drawn off in such a way that the height of said ribs exceeds about 0.2 mm.

7. The process of claim 6, wherein said plastic synthetic resin composition is extruded and drawn off in such a way that the spacing between the ribs is slightly larger than the width of said ribs.

8. The process according to claim 1, wherein said cooled smoothing calender comprises at least two parallel cylindrical rolls, said extruded sheet being passed between the nip between said rolls.

9. The process according to claim 8, wherein said extruded sheet tangentially engages one of said rolls prior to passage through said nip and further tangentially engages another of said rolls after passing through said nip.

10. The process according to claim 9, wherein said extruded sheet remains in contact with said one roll as it travels through an arc of about 180° and further wherein said extruded sheet remains in contact with said another roll as it travels through an arc of about 180°.

11. The process according to claim 10, wherein said extruded sheet is passed through a cooling liquid bath after leaving said cooled smoothing calender.

12. The process according to claim 1, wherein said extruded sheet is passed through a cooling liquid bath after leaving said cooled smoothing calender.

13. The process according to claim 1, wherein said cooled smoothing calender is positioned such that the distance travelled by said extruded sheet as it passes from said nozzle to the point where said rib sheet tangentially engages said calender is about 2 to 10 cm.

14. The process according to claim 3, wherein said cooled smoothing calender is positioned such that the distance travelled by said extruded sheet as it passes from said nozzle to the point where said rib sheet tangentially engages said calender is about 2 to 10 cm.

15. The process according to claim 9, wherein said cooled smoothing calender is positioned such that the distance travelled by said extruded sheet as it passes from said nozzle to the point where said rib sheet tangentially engages said calender is about 2 to 10 cm.

16. The process according to claim 1, wherein said extruded sheet is horizontal as it passes between said slotted nozzle and said smoothing calender.

17. The process according to claim 2, wherein said extruded sheet is horizontal as it passes between said slotted nozzle and said smoothing calender.

18. The process according to claim 1, wherein said fixed rate is the same as the extrusion rate.

19. The process according to claim 3, wherein said fixed rate is the same as the extrusion rate.

20. The process according to claim 9, wherein said fixed rate is the same as the extrusion rate.

21. The process according to claim 1, wherein said extruded sheet is drawn through said cooled smoothing calender immediately after being extruded from said nozzle.

22. The process according to claim 21 further comprising winding up said unstretched bilaterally corrugated plastic sheet into a coil.

23. The process according to claim 3, wherein said extruded sheet is drawn off by said cooled smoothing calender immediately after being extruded from said nozzle.

24. The process according to claim 23 further comprising winding up said unstretched bilaterally corrugated plastic sheet into a coil.

25. The process according to claim 9, wherein said extruded sheet is drawn through said cooled smoothing calender immediately after being extruded from said nozzle.

26. The process according to claim 25 further comprising winding up said unstretched bilaterally corrugated plastic sheet into a coil.

27. The process according to claim 32, wherein said extruded sheet is drawn through said cooled smoothing calendar immediately after being extruded from said nozzle.

28. The process according to claim 27 further comprising winding up said unstretched bilaterally corrugated plastic sheet into a coil.

29. The process according to claim 1, wherein the rate of extrusion and the rate of drawing off are at a rate which ensures that no local acceleration and no elongation of the sheet occurs.

30. The process according to claim 1, wherein the extrusion rate from said nozzle is from 1-2 cm/sec.

31. A process for producing an unstretched bilaterally corrugated plastic sheet having a plurality of longitudinally extending parallel ribs on both sides thereof comprising extruding a plastic synthetic resin composition heated to a temperature above the melting point thereof from a wide band nozzle provided at its upper and lower sides in the flow direction with milled-in grooves to form an extruded sheet having longitudinally extending parallel ribs on both sides thereof, said ribs being arranged in exact opposition on each side of said sheet, drawing off the extruded heated sheet in the longitudinal direction of the ribs from said nozzle by conducting the sheet through a cooled smoothing calender, and cooling the extruded sheet within said calender to solidify said synthetic resin composition and thereby to form said unstretched bilaterally corrugated plastic sheet, said extruded sheet being drawn off from said nozzle at a fixed rate which is the same as or slightly more than the extrusion rate from said nozzle so that the ribs on said unstretched bilaterally corrugated plastic sheet exiting from said calender are uniform in size and shape, the height and width of the ribs being from about 1/15 to about equal to the thickness of a basic, non-ribbed, portion of the sheet and the basic, non-ribbed, portion of the sheet having a thickness of about 0.5 to 3 mm.

32. The process according to claim 31, wherein said cooled smoothing calender comprises at least two parallel cylindrical rolls defining a nip therebetween, said sheet tangentially engaging the periphery of one of said rolls prior to passage of said sheet through said nip, said sheet tangentially engaging the periphery of another of said rolls after passage of said sheet through said nip.

33. The process of claim 32, wherein said sheet remains in contact with the periphery of said one roll as said one roll rotates through an arc of about 180°, and further wherein said sheet remains in contact with said another roll as said another roll rotates through an arc of about 180°.

34. The process of claim 31, wherein said cooled smoothing calender is positioned closely adjacent to said nozzle.

35. The process according to claim 31, wherein said cooled smoothing calender is positioned such that the distance travelled by said extruded sheet as it passes from said nozzle to the point where said rib sheet tangentially engages said calender is about 2 to 10 cm.

36. The process according to claim 32, wherein said cooled smoothing calender is positioned such that the distance travelled by said extruded sheet as it passes from said nozzle to the point where said rib sheet tangentially engages said calender is about 2 to 10 cm.

37. The process according to claim 31, wherein said extruded sheet is horizontal as it passes between said slotted nozzle and said smoothing calender.

38. The process according to claim 32, wherein said extruded sheet is horizontal as it passes between said slotted nozzle and said smoothing calender, and further wherein the arrangement of said cooled smoothing calender with respect to said slotted nozzle and the extent of cooling provided by said cooled smoothing calendar are so selected that said extruded sheet solidifies as it passes through said calender.

39. The process according to claim 31, wherein said fixed rate is the same as the extrusion rate.

40. The process according to claim 31, wherein said extruded sheet is drawn through said cooled smoothing calender immediately after being extruded from said nozzle.

41. The process according to claim 40 further comprising winding up said unstretched bilaterally corrugated plastic sheet into a coil.

42. The process according to claim 31, wherein said plastic synthetic resin is soft PVC.

43. A process for solidifying an extruded sheet passing out of an extrusion nozzle at an extrusion temperature, said extruded sheet having a plurality of longitudinally extending parallel ribs on both sides thereof, the ribs being arranged in exact opposition on each side of said sheet, which comprises conducting said extruded sheet immediately as it passes out of said extrusion nozzle through a distance of about 2 to 10 centimeters in the atmosphere to a cooled smoothing calender, and drawing the extruded sheet through the cooled smoothing calender, said extruded sheet engaging rolls of said calender in such a way that said extruded sheet is solidified by the time said extruded sheet passes through and separates from said calender, the ribs on said sheet being uniform in size and shape, with the height and width of the ribs being from about 1/15 to about equal to the thickness of a basic, non-ribbed, portion of the sheet and the basic, non-ribbed, portion of the sheet having a thickness of about 0.5 to 3 mm.

44. The process according to claim 43, wherein said extruded sheet is comprises of soft PVC.

45. A process for the production of an unstretched bilaterally corrugated plastic sheet having a plurality of longitudinally extending parallel ribs on both sides thereof, said ribs being arranged in exact opposition on each side of said sheet and being approximately from about 1/15 to about equal to the thickness of an unribbed center portion of the sheet, comprising extruding a plastic synthetic resin composition in a horizontal plane from a slotted nozzle which is fashioned to be comb-like on both sides thereof, drawing off the extruded sheet in the longitudinal direction of the ribs from said slotted nozzle by conducting the sheet through a distance of from about 2 to 10 centimeters in the atmosphere to a cooled smoothing calender, and cooling and solidifying the extruded sheet within said calender to form said unstretched bilaterally corrugated plastic sheet, said extruded sheet being drawn off from said nozzle at a fixed rate which is the same as or slightly more than the extrusion rate from said nozzle so that the ribs on said unstretched bilaterally corrugated plastic sheet exiting from the calender are uniform in size and shape and the unribbed portion of the sheet having a thickness of about 0.5 to 3 mm.

* * * * *